(12) United States Patent
Frey et al.

(10) Patent No.: US 9,858,340 B1
(45) Date of Patent: Jan. 2, 2018

(54) SYSTEMS AND METHODS FOR QUERYABLE GRAPH REPRESENTATIONS OF VIDEOS

(71) Applicant: Digital Reasoning Systems, Inc., Franklin, TN (US)

(72) Inventors: John Frey, Arlington, VA (US); James Whitaker, Nashville, TN (US); Matthew Russell, Franklin, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 0 days.

(21) Appl. No.: 15/484,406

(22) Filed: Apr. 11, 2017

Related U.S. Application Data

(60) Provisional application No. 62/320,906, filed on Apr. 11, 2016.

(51) Int. Cl.
*G06K 9/34* (2006.01)
*G06F 17/30* (2006.01)
(Continued)

(52) U.S. Cl.
CPC .... *G06F 17/30787* (2013.01); *G06F 17/3079* (2013.01); *G06F 17/3084* (2013.01);
(Continued)

(58) Field of Classification Search
CPC ........... G06F 17/30017; G06F 17/3002; G06F 17/30023; G06F 17/30026;
(Continued)

(56) References Cited

U.S. PATENT DOCUMENTS 5,091,965 A    2/1992    Kobayashi et al.
5,129,040 A    7/1992    Hanazato et al.
(Continued)

FOREIGN PATENT DOCUMENTS

WO     2014003748 A1     1/2014

OTHER PUBLICATIONS

Coveyduc, J. et al., "Building a Smarter Plant. A Smarter Planet Blog," May 5, 2015, http://asmarterplanet.com/blog/2015/watson-ted.html, 11 pages.
(Continued)

*Primary Examiner* — Jose Couso
(74) *Attorney, Agent, or Firm* — Meunier Carlin & Curfman LLC

(57) ABSTRACT

In one aspect, the present disclosure relates to a method which, in one embodiment, includes: receiving video data for a first video; deconstructing the video data of the first video into a plurality of context windows; performing, on each context window that includes an image frame, a video analytic function on the image frame to identify one or more characteristics of the context window; performing, on each context window that includes an audio frame, a video analytic function on the audio frame to identify one or more characteristics of the context window; generating, for each context windows, a respective local atomic unit comprising attributes derived from the identified one or more characteristics of the respective context window, to form a plurality of local atomic units; and generating a local graph representation of the first video, comprising a plurality of nodes corresponding to the plurality of local atomic units.

21 Claims, 10 Drawing Sheets

(51) Int. Cl.

| | | |
|---|---|---|
| *G06K 9/00* | (2006.01) | |
| *G06K 9/62* | (2006.01) | |
| *G10L 25/30* | (2013.01) | |
| *G06K 9/46* | (2006.01) | |
| *G10L 15/26* | (2006.01) | |
| *G10L 15/20* | (2006.01) | |
| *G10L 15/00* | (2013.01) | |
| *G10L 17/00* | (2013.01) | |

(52) U.S. Cl.
CPC ... *G06F 17/30849* (2013.01); *G06K 9/00765* (2013.01); *G06K 9/4628* (2013.01); *G06K 9/6296* (2013.01); *G10L 15/005* (2013.01); *G10L 15/20* (2013.01); *G10L 15/265* (2013.01); *G10L 17/005* (2013.01); *G10L 25/30* (2013.01)

(58) Field of Classification Search
CPC .............. G06F 17/30029; G06F 17/301; G06F 17/30106; G06F 17/30109; G06F 17/30277; G06F 17/30572; G06F 17/30823; G06F 17/30634; G06F 17/30705; G06F 17/3074; G06F 17/30781–17/30793; G06F 17/30825; G06F 17/30831; G06F 17/30846; G06F 17/30849; G06F 17/30852; G06F 17/30964; G06F 17/30858; G06F 17/3079; G06F 17/30247; G06F 17/30651; G06F 17/30864; G06F 17/30843; G06K 9/00765; G06K 9/4628; G06K 9/6296; G06K 9/00744; G06K 9/00711; G06K 9/00758; G06K 9/4676; G06K 9/00342; G06K 9/00624; G06K 9/00718; G06K 9/00751; G10L 15/005; G10L 15/20; G10L 15/265; G10L 17/00; G10L 17/005; G10L 25/30; G10L 25/48; G11B 27/34; G11B 27/28; G11B 27/034; H04N 21/8456; H04N 21/47205; H04N 21/8133; H04N 21/84; H04N 21/23418; H04N 21/8455; H04N 21/232; H04N 21/23109; H04N 21/23412; H04N 21/234327; Y10S 707/99933; Y10S 707/99931; G06T 7/97

See application file for complete search history.

(56) References Cited

U.S. PATENT DOCUMENTS

| | | | |
|---|---|---|---|
| 6,084,981 A | 7/2000 | Horiba et al. | |
| 6,404,925 B1 * | 6/2002 | Foote ................ | G06F 17/30746 |
| | | | 348/480 |
| 6,721,454 B1 | 4/2004 | Qian et al. | |
| 6,731,788 B1 | 5/2004 | Agnihotri et al. | |
| 6,925,455 B2 | 8/2005 | Gong et al. | |
| 7,421,455 B2 | 9/2008 | Hua et al. | |
| 8,165,870 B2 | 4/2012 | Acero et al. | |
| 8,219,406 B2 | 7/2012 | Yu et al. | |
| 8,473,430 B2 | 6/2013 | Yu et al. | |
| 8,489,529 B2 | 7/2013 | Deng et al. | |
| 8,666,910 B2 | 3/2014 | Chen et al. | |
| 8,700,552 B2 | 4/2014 | Yu et al. | |
| 8,719,884 B2 * | 5/2014 | Sharon ................ | H04H 60/59 |
| | | | 725/115 |
| 8,799,257 B1 | 8/2014 | Hubinette | |
| 8,831,358 B1 | 9/2014 | Song et al. | |
| 8,856,004 B2 | 10/2014 | Basson et al. | |
| 8,918,352 B2 | 12/2014 | Deng et al. | |
| 8,923,609 B2 | 12/2014 | Eaton et al. | |
| 8,924,210 B2 | 12/2014 | Basson et al. | |
| 8,949,198 B2 | 2/2015 | Sarshar et al. | |
| 9,020,244 B2 | 4/2015 | van Zwol et al. | |
| 9,195,650 B2 | 11/2015 | Basson et al. | |
| 9,510,044 B1 * | 11/2016 | Pereira ............ | H04N 21/44008 |
| 2004/0010480 A1 | 1/2004 | Agnihotri et al. | |
| 2004/0111432 A1 | 6/2004 | Adams, Jr. et al. | |
| 2007/0033170 A1 * | 2/2007 | Sull .................. | G06F 17/30796 |
| 2008/0193016 A1 | 8/2008 | Lim et al. | |
| 2009/0219439 A1 | 9/2009 | Sellers et al. | |
| 2010/0039556 A1 | 2/2010 | Au et al. | |
| 2011/0047163 A1 | 2/2011 | Chechik et al. | |
| 2012/0065976 A1 | 3/2012 | Deng et al. | |
| 2012/0072215 A1 | 3/2012 | Yu et al. | |
| 2012/0254086 A1 | 10/2012 | Deng et al. | |
| 2012/0303565 A1 | 11/2012 | Deng et al. | |
| 2012/0303932 A1 | 11/2012 | Farabet et al. | |
| 2013/0138436 A1 | 5/2013 | Yu et al. | |
| 2013/0138589 A1 | 5/2013 | Yu et al. | |
| 2013/0212052 A1 | 8/2013 | Yu et al. | |
| 2013/0282634 A1 | 10/2013 | Deng et al. | |
| 2013/0343641 A1 | 12/2013 | Mnih et al. | |
| 2014/0067735 A1 | 3/2014 | Yu et al. | |
| 2014/0068740 A1 | 3/2014 | LeCun et al. | |
| 2014/0092990 A1 | 4/2014 | Vuskovic et al. | |
| 2014/0132786 A1 | 5/2014 | Saitwal et al. | |
| 2014/0142929 A1 | 5/2014 | Seide et al. | |
| 2014/0156575 A1 | 6/2014 | Sainath et al. | |
| 2014/0177947 A1 | 6/2014 | Krizhevsky et al. | |
| 2014/0180986 A1 | 6/2014 | Hinton et al. | |
| 2014/0180989 A1 | 6/2014 | Krizhevsky et al. | |
| 2014/0229158 A1 | 8/2014 | Zweig et al. | |
| 2014/0249799 A1 | 9/2014 | Yih et al. | |
| 2014/0257803 A1 | 9/2014 | Yu et al. | |
| 2014/0257804 A1 | 9/2014 | Li et al. | |
| 2014/0257805 A1 | 9/2014 | Huang et al. | |
| 2014/0278424 A1 | 9/2014 | Deng et al. | |
| 2014/0328570 A1 | 11/2014 | Cheng et al. | |
| 2014/0366113 A1 | 12/2014 | LeCun et al. | |
| 2015/0032449 A1 | 1/2015 | Sainath et al. | |
| 2015/0066820 A1 | 3/2015 | Kapur et al. | |
| 2015/0130952 A1 | 5/2015 | Wang et al. | |
| 2015/0161994 A1 | 6/2015 | Tang et al. | |
| 2015/0170053 A1 | 6/2015 | Miao | |
| 2016/0099010 A1 | 4/2016 | Sainath et al. | |
| 2016/0171974 A1 | 6/2016 | Hannun et al. | |

OTHER PUBLICATIONS

Sainath, T. et al., "Convolutional, Long Short-Term Memory, Fully Connected Deep Neural Networks," IEEE Xplore, Aug. 6, 2015, 5 pages.

* cited by examiner

SYSTEMS AND METHODS FOR QUERYABLE GRAPH REPRESENTATIONS OF VIDEOS

CROSS-REFERENCE TO RELATED APPLICATIONS

This application claims priority to and the benefit of U.S. Provisional Application No. 62/320,906, filed Apr. 11, 2016, which is hereby incorporated by reference herein in its entirety as if fully set forth below.

BACKGROUND

With hundreds of thousands of hours of video content every day, it is difficult to identify videos of interest, or portions of the videos that are of interest. In the related art, querying videos usually relies on user generated tags and titles of the video content to perform basic query searches. However, the tags are generally applied to a video as a whole, and the videos are not represented in a cohesive manner. In addition, the reliance on user generated tags and titles requires a large amount of time, is subject to inaccuracies, and cannot easily be updated to identify additional information. It is with respect to these and other considerations that aspects of the present disclosure are presented herein.

SUMMARY

In one aspect, the present disclosure relates to a computer-implemented method. In one embodiment, the method includes receiving video data for a first video and deconstructing the video data of the first video into a plurality of context windows. Each of the context windows comprises one or more of: an image frame of a segment of the first video from the video data, and an audio frame of a segment the first video from the video data. The method also includes performing, on each context window of the plurality of context windows that includes an image frame, a video analytic function on the image frame to identify one or more characteristics of the context window that are associated with image-related content of the first video. The method also includes performing, on each context window of the plurality of context windows that includes an audio frame, a video analytic function on the audio frame to identify one or more characteristics of the context window that are associated with audio-related content of the first video. The method also includes generating, for each of the plurality of context windows, a respective local atomic unit comprising attributes derived from the identified one or more characteristics of the respective context window, to form a plurality of local atomic units, and generating a local graph representation of the first video, comprising a plurality of nodes corresponding to the plurality of local atomic units. Generating the local graph representation comprises applying local graph edges connecting the plurality of nodes to each other, wherein the local graph edges represent relationships between the connected nodes based, at least in part, on the attributes of the corresponding local atomic units.

In some embodiments, the method further includes generating a global atomic unit comprising attributes derived from the local graph representation, and generating a global graph representation of a plurality of videos that includes the first video, wherein the global graph representation includes a first node corresponding to the global atomic unit corresponding to the first video and a plurality of second nodes corresponding to respective global atomic units of respective second videos of the plurality of videos. Generating the global graph representation of the plurality of videos comprises applying global graph edges connecting the plurality of nodes to each other. The global graph edges represent relationships between the connected nodes based, at least in part, on the attributes of the corresponding global atomic units.

In some embodiments, the method further includes receiving a query of the global graph representation for information associated with content of the plurality of videos, and producing, in response to the query and by analyzing the global graph representation, a response including the information associated with the content of the plurality of videos.

In another aspect, the present disclosure relates to a system. In one embodiment, the system includes a memory device and one or more processors operatively coupled to the memory device. The memory device stores computer-executable instructions that, when executed by the one or more processors, cause the system to perform specific functions. In one embodiment, the specific functions performed by the system include receiving video data for a first video and deconstructing the video data of the first video into a plurality of context windows. Each of the context windows comprises one or more of: an image frame of a segment of the first video from the video data, and an audio frame of a segment the first video from the video data. The specific functions performed also include performing, on each context window of the plurality of context windows that includes an image frame, a video analytic function on the image frame to identify one or more characteristics of the context window that are associated with image-related content of the first video. The specific functions performed by the system also include performing, on each context window of the plurality of context windows that includes an audio frame, a video analytic function on the audio frame to identify one or more characteristics of the context window that are associated with audio-related content of the first video. The specific functions performed by the system also include generating, for each of the plurality of context windows, a respective local atomic unit comprising attributes derived from the identified one or more characteristics of the respective context window, to form a plurality of local atomic units, and generating a local graph representation of the first video, comprising a plurality of nodes corresponding to the plurality of local atomic units. Generating the local graph representation comprises applying local graph edges connecting the plurality of nodes to each other, wherein the local graph edges represent relationships between the connected nodes based, at least in part, on the attributes of the corresponding local atomic units.

In some embodiments, the specific functions performed by the system also include generating a global atomic unit comprising attributes derived from the local graph representation, and generating a global graph representation of a plurality of videos that includes the first video, wherein the global graph representation includes a first node corresponding to the global atomic unit corresponding to the first video and a plurality of second nodes corresponding to respective global atomic units of respective second videos of the plurality of videos. Generating the global graph representation of the plurality of videos comprises applying global graph edges connecting the plurality of nodes to each other. The global graph edges represent relationships between the connected nodes based, at least in part, on the attributes of the corresponding global atomic units.

In some embodiments, the specific functions performed by the system also include receiving a query of the global graph representation for information associated with content of the plurality of videos, and producing, in response to the query and by analyzing the global graph representation, a response including the information associated with the content of the plurality of videos.

In yet another aspect, the present disclosure relates to a non-transitory computer-readable medium which stores instructions that, when executed by one or more processors, cause one or more computing devices to perform specific functions. In one embodiment, the specific functions performed by the one or more computing devices include receiving video data for a first video and deconstructing the video data of the first video into a plurality of context windows. Each of the context windows comprises one or more of: an image frame of a segment of the first video from the video data, and an audio frame of a segment the first video from the video data. The specific functions performed by the one or more computing devices also include performing, on each context window of the plurality of context windows that includes an image frame, a video analytic function on the image frame to identify one or more characteristics of the context window that are associated with image-related content of the first video. The specific functions performed by the one or more computing devices also include performing, on each context window of the plurality of context windows that includes an audio frame, a video analytic function on the audio frame to identify one or more characteristics of the context window that are associated with audio-related content of the first video. The specific functions performed by the one or more computing devices also include generating, for each of the plurality of context windows, a respective local atomic unit comprising attributes derived from the identified one or more characteristics of the respective context window, to form a plurality of local atomic units, and generating a local graph representation of the first video, comprising a plurality of nodes corresponding to the plurality of local atomic units. Generating the local graph representation comprises applying local graph edges connecting the plurality of nodes to each other, wherein the local graph edges represent relationships between the connected nodes based, at least in part, on the attributes of the corresponding local atomic units.

In some embodiments, the specific functions performed by the one or more computing devices also include generating a global atomic unit comprising attributes derived from the local graph representation, and generating a global graph representation of a plurality of videos that includes the first video, wherein the global graph representation includes a first node corresponding to the global atomic unit corresponding to the first video and a plurality of second nodes corresponding to respective global atomic units of respective second videos of the plurality of videos. Generating the global graph representation of the plurality of videos comprises applying global graph edges connecting the plurality of nodes to each other. The global graph edges represent relationships between the connected nodes based, at least in part, on the attributes of the corresponding global atomic units.

In some embodiments, the specific functions performed by the one or more computing devices also include receiving a query of the global graph representation for information associated with content of the plurality of videos, and producing, in response to the query and by analyzing the global graph representation, a response including the information associated with the content of the plurality of videos.

BRIEF DESCRIPTION OF THE DRAWINGS

Reference will now be made to the accompanying drawings, which are not necessarily drawn to scale.

DETAILED DESCRIPTION

Figure 1:
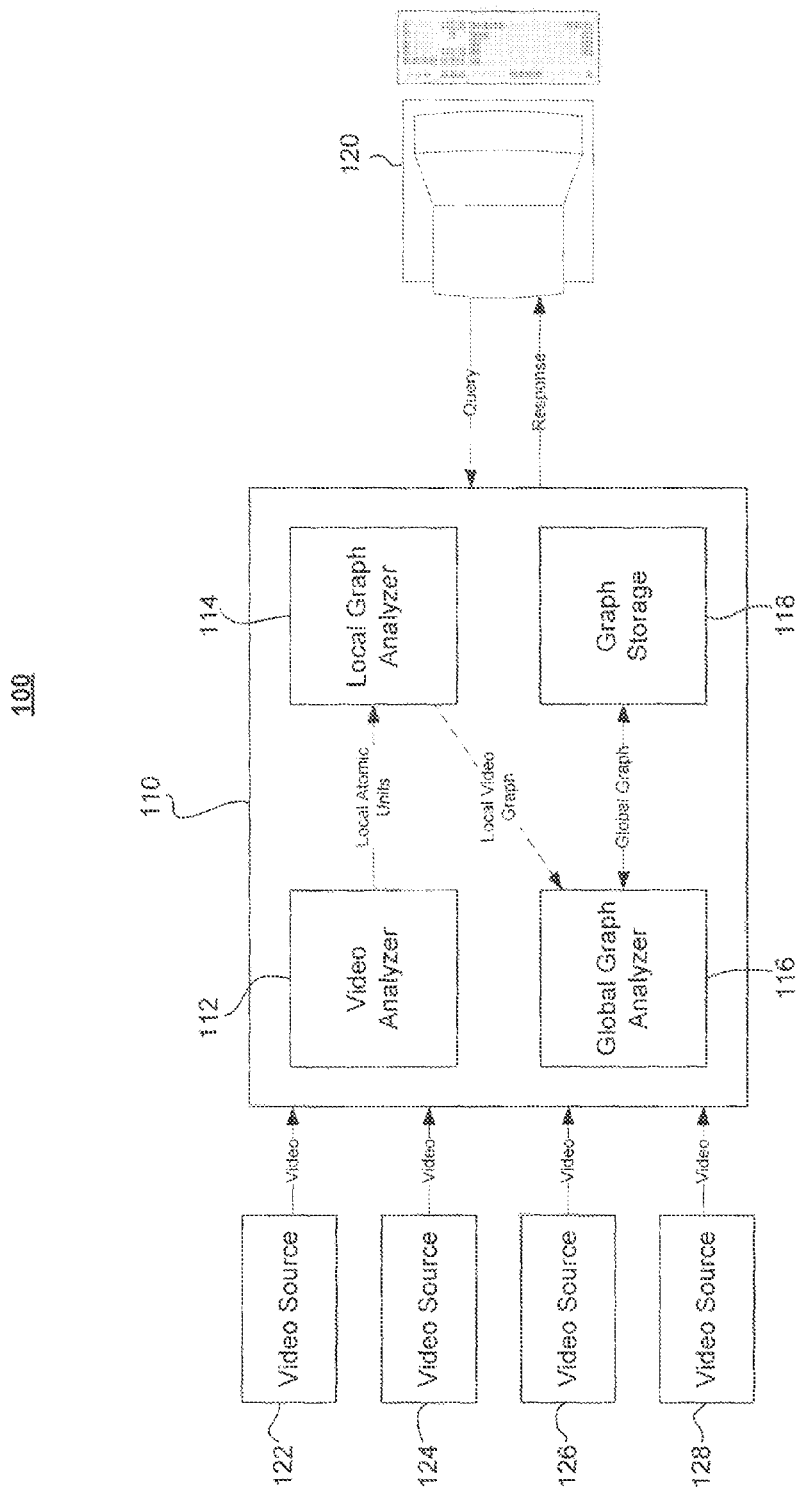
FIG. 1 illustrates an environment for implementing one or more example embodiments.

Although example embodiments of the present disclosure described herein are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps or blocks of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

In the following detailed description, references are made to the accompanying drawings that form a part hereof and that show, by way of illustration, specific embodiments or examples. In referring to the drawings, like numerals represent like elements throughout the several figures.

The following provides a description of non-limiting definitions and discussion of some terms and concepts that are referred to and used throughout the present application in the discussion of various embodiments of the disclosed technology.

A "video" or "video stream" can refer to a recording of moving visual images that may include an audio stream and may include additional metadata. A video can be represented by a collection of context windows.

An "image frame" can refer to a static image taken from a video stream. In various embodiments, the image frame is the most atomic image-unit of a video.

An "audio frame" can refer to a collection of amplitude (or loudness) information. The audio frame can be considered the most atomic audio-unit of a video.

A "context window" can be comprised of one or more image frames and one or more audio frames. A context window can be represented as a local atomic unit of a video graph.

A "video analytic" can refer to an analytical function that produces an output and is applied to a context window. Video analytics may compute on any or all information contained within a context window.

A "local atomic unit" can represent a context window as a node in a local video graph.

A "local graph analytic" can apply edges between local atomic units via relationships between their attributes.

A "local atomic unit attribute" can refer to the output of a local video graph analytic applied to a local atomic unit's context window.

A "local video graph" (or "local graph representation") can encapsulate a single video into a graph structure. Local video graph nodes can be local atomic units derived from the video. Local video graph edges can be defined by relationships between local atomic unit attributes.

A "global atomic unit" can represent a local video graph in the context of a global video graph. The global atomic unit can represent a local video graph as a single node.

A "global graph analytic" can apply edges between global atomic units via relationships between their attributes. Global graph analytics may leverage temporal information to apply edges.

A "global atomic unit attribute" can be an aggregate of its constituent of the attributes of its local atomic units. Global atomic unit attributes may contain temporal information discerned from a local atomic unit.

A "global video graph" (also referred to herein as a "global graph representation" or "global media graph") can encapsulate relationships between distinct videos into a graph structure. A global video graph can be created by applying global graph analytics to a collection of global atomic units.

In some embodiments, video content can be represented in a computable graph representation. The graph can effectively organize video content by nodes and edges. Videos or segments of videos can be nodes within a graph that unroll to time-series events. Nodes can be time series information organized into a graph, which may be a linear sequence with minimal branches in some embodiments. A graph of graphs can connect time series information together. A video can refer to a recording of moving visual images that may include an audio stream and may include additional metadata. In some embodiments, a graph representation of a video can be constructed into a directed acyclic graph (DAG); this graph can be treated as a node in a larger graph, with edges between nodes connecting underlying properties of a particular video.

In some embodiments, edges to a video in a graphical-type structure may be utilized for an event being observed from multiple viewpoints or videos or from analytics that yield a particular connection (e.g., a dog detected in two different videos at particular times). Aspects for yielding such particular connections include the output of analytics on a video from one or more image frames and/or audio frames, or any combination of the content contained within. Further aspects for forming such connections can include one or more of image classifications and object detection, spoken language detection, keyword spotting, and speaker detection, and/or characteristics extracted in numerical or metadata form.

In some embodiments, a video can be converted into queryable information that represents actual content of the video. Various forms of information can be extracted from the video data and analyzed, and a user-queryable knowledge representation of the analyzed, extracted information can be constructed.

In some embodiments, given video data may represent a recording of moving visual images and may include an audio stream and additional metadata, the video may be deconstructed into context windows that may include one or more image frames (e.g., a static image taken from the video) and/or audio frames. The one or more image frames can be static image frames taken from the video, and the audio frames can be comprised of amplitude and/or frequency information corresponding to an audio segment.

In some embodiments, a local video graph may be constructed that encapsulates a video into a graph structure, where nodes (local atomic units) represent context windows. The nodes may include attributes derived from characteristics of the context window, such as a person being detected or a language being spoken within the context window. Edges between the nodes may represent relationships between attributes of the local atomic units. For example one relationship between attributes may be that a same person was detected in multiple context windows, or that a first context window occurred prior in time to a second context window. The attributes of the local atomic units may be identified and the edges between the nodes may be applied by applying a local graph analytic.

In some cases, the local atomic unit may be used as a dictionary of a video. A given context window acts as a key to a local atomic unit, and attributes of the local atomic unit act as the definitions of the context window. In some embodiments, one or more attributes may be cached or stored for later use.

As a non-limiting example, audio or image data from audio or image frames of a context window may be converted into an abstract vector and represented as one or more attributes of a corresponding local atomic unit.

Analyzing text, for example through natural language processing (NLP) analysis, may be thought of as a one-dimensional task. That is, in some cases, a text document may be considered one long line of text. On the other hand, analysis of a two-dimensional still image must account for spatial arrangement (up-down-left-right, etc.) of image pixels. In other words, an image may not be fully represented by as a single line of pixel values. A sound wave can be described in terms of a time axis along with an amplitude and frequency. Additionally, a sound wave may be represented visually by a spectrogram. Spectrograms can be a convenient representation of audio for machine learning algorithms.

When analyzing one or more image frames of a context window, the analysis (also referred to herein with respect to an "analytic function" or "video analytic") may, for example, produce a classification, detect an object, or perform segmentation. When analyzing one or more audio frames of a context window, the analysis may, for example, detect noise, transcribe speech, and/or identify speakers or languages, among other functions. In some embodiments, analysis may be jointly performed on both image frames and audio frames of a context window, and may, for example, exploit the image frames to produce diarized transcription (i.e., speaker specific) of the audio frames. With this information gained through the analysis, a local video graph representing the video may be created.

In some embodiments, neural network-based analysis (sometimes referred to with respect to "deep learning") of context windows of a video can generate information on the actual content of the context windows (i.e., actual content of particular image frames and/or audio frames that make up the various context windows from the video).

Reference will now be made to the figures in describing one or more example embodiments. One of ordinary skill will understand that the description and figures are non-limiting, and that various additions, subtractions, and alterations may be made to the example embodiments discussed below without departing from the scope of the present disclosure.

FIG. 1 illustrates a system and processes (collectively 100) for implementing one or more aspects of the present disclosure described herein, in accordance with various embodiments. Referring to FIG. 1, a system 110 communicates with a computing device 120 that may be operated by a user, and one or more video sources 122, 124, 126, and 128. The system 110 may include a video analyzer 112, a local graph analyzer 114, a global graph analyzer 116, and a graph storage device 118. The video analyzer 112, the local graph analyzer 114, the global analyzer 116, and the graph storage device 118 may be implemented as one or more hardware components (e.g., one or more processors and memory) or computer-executable software modules, and may, in some cases, be implemented as a combination of hardware and software. The system 110 may be comprised of one or more computing devices or systems, including local or remote client or server systems. The system 110 may receive videos from the one or more video sources 122, 124, 126, 128, receive queries related to the videos from the computing device 120, and provide a response with results to the queries back to the computing device 120.

As a non-limiting example, the system 110 may actively acquire (for instance, through crawling websites and collecting content) for videos to retrieve the videos from the video sources 122, 124, 126, 128, or the video sources 122, 124, 126, 128 may actively submit the videos to the system 110. The acquisition or receiving of videos can be referred to herein as receiving or acquiring "video data" associated with the respective video(s).

In some embodiments, the video analyzer 112 may analyze the videos to create local atomic units (e.g., nodes) corresponding to context windows of the respective videos. The local graph analyzer 114 may analyze the local atomic units and connect the local atomic units based on, for example, respective attributes of the local atomic units. The local graph analyzer 114 may form a local video graph corresponding to a particular video. The global graph analyzer may analyze the local video graphs, and connect them based on their attributes to form a global video graph. The graph storage device 118 may store the global video graph. Elements of the system 110 in accordance with some embodiments will be described below in greater detail.

The system 110 may receive queries from the computing device 120. As will be described in further detail below, the system 110 can search and/or analyze data representations in the global video graph, or to a portion of the global video graph, and provide responses (i.e., results) to the video queries back to the computing device 120 based thereon.

Figure 2:
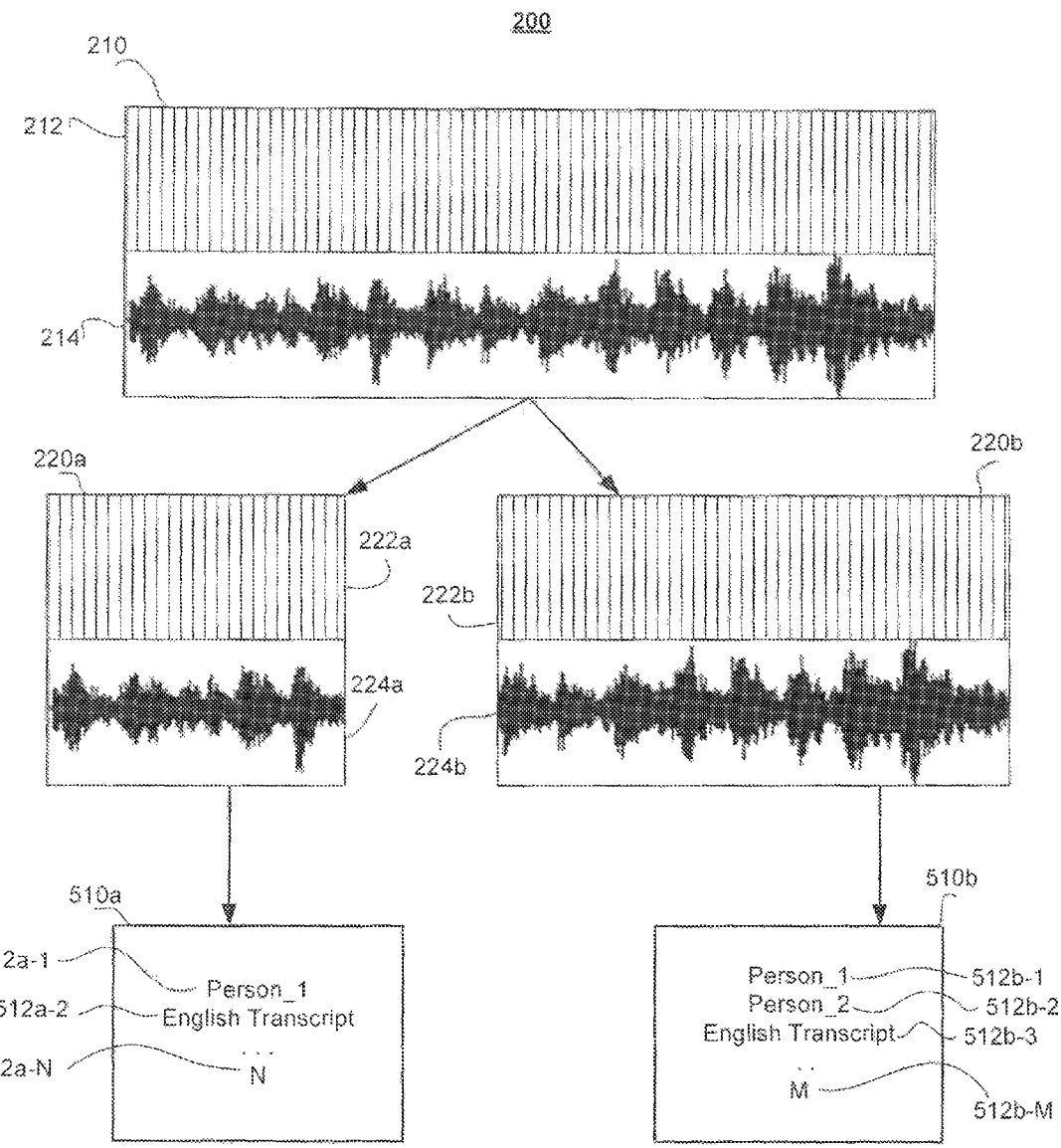
FIG. 2 illustrates a process of analyzing a video according to an example embodiment.

FIG. 2 illustrates a process 200 by which the video analyzer 112 (FIG. 1) may analyze a video 210, in accordance with one example embodiment. The video analyzer 112 can receive video data 210 associated with a video, the video including a plurality of image frames 212 and an audio stream 214 comprised of a plurality of audio frames. The video analyzer 112 can separate the video 210 into a plurality of context windows 220a and 220b. Each of the context windows 220a and 220b includes image frames 222a and 222b and respective audio frames 224a and 224b. It should be recognized that in other embodiments, some context windows may include only image frames or only an audio frame.

In some embodiments, context windows 220a and 220b may be mutually exclusive (e.g., context window 220a includes image frames and audio frames from a first 20 seconds of the video 210, while context window 220b includes image frames and audio frames from a next 30 seconds of the video). In some cases, context windows 220a and 220b may partially overlap or context window 220b may be a sub-portion of context window 220a (e.g., context window 220a includes image frames and audio frames from a first 20 seconds of the video 210, while context window 220b includes image frames and audio frames from a first 5 seconds of the video). Context windows 220a and 220b may each include image frames and audio frames from respective continuous portions of the video 210, or may include image frames and audio frames from separated (i.e., discontinuous) portions of the video. Although two context windows 220a and 220b are described, one of ordinary skill will understand that this is merely an example. In some cases, a video 210 may be considered as a single context window, or may be divided into three or more context windows.

The video analyzer 112 analyzes (e.g., decodes) the image frames 222a and 222b and audio frames 224a and 224b of the context windows 220a and 220b to form local atomic units 510a and 510b. The video analyzer 112 may process the context windows 220a and 220b to create corresponding local atomic units 510a and 510b. The local atomic units 510a and 510b include one or more attributes 512a-1-512a-N and 512b-1-512b-M. In some cases, the video analyzer 112 generates the one or more attributes 512a-1-512a-N and 512b-1-512b-M using video analytics, for example, by identifying or analyzing characteristics of the context window. The characteristics may be features of the context window or derived from features of the context windows. As a non-limiting example, the characteristics may include data representing the audio frame of a context window, data representing a spectrogram of the audio frame, or information derived from the audio frame or spectrogram. Additional examples characteristics will be discussed below in greater detail. As can be seen the example of FIG. 2, local atomic unit 510a includes the attributes that person 1 is identified 512a-1 and that an English language transcript is available 512a-2, and local atomic unit 510b includes the attributes that person 1 is identified 512b-1, person 2 is identified 512*b*-2, and that an English language transcript is available 512*b*-3. The local atomic units 510*a* and 510*b* are sent to the local graph analyzer 114 as will be described below in greater detail with reference to FIG. 5.

In some cases, analyzing an image frame can include extracting characteristics, manufacturing metadata (scene information, etc.), and generating a caption. In some embodiments, a text caption may be generated by using features from a convolutional neural network (as an image classifier) as input into a recurrent neural network (to handle sequential tasks). In some embodiments, analyzing an audio frame can include extracting features, transcribing speech (i.e., performing speech-to-text conversion), and manufacturing metadata such as information on background noise and/or speaker identification.

While some aspects of the present disclosure are described herein in relation to embodiments with one audio channel and one video channel, some aspects may be used in embodiments in the setting of media with multiple audio channels and/or multiple video channels operating simultaneously. As a non-limiting example, the video data may include a plurality of video streams of a scene from one or more positions (e.g., security footage captured from a plurality of security cameras contemporaneously). As another non-limiting example, the video data may include a plurality of audio streams captured from a plurality of devices (e.g., from a plurality of microphones at a news conference). In some cases, one or more context windows of the video data may include image frames or audio frames from a plurality of video or audio streams. In such cases, a video analytic may analyze the image frame or audio frames across the plurality of video or audio streams.

As a non-limiting example, a representative context window may be determined to represent a news story that is broadcast in video form. The "news story" may include, for example, a video showing a news commentator (person) with other visual content contained within a screen that would be presented to a viewer (e.g., from a television or other media provider, which may herein be generally referred to as a broadcast), and a corresponding audio stream being presented, for instance spoken commentary from the commentator and/or relevant other audio segments associated with a topic of discussion in the news story. In some cases, video analytics may be performed on the image frames of the context window to determine that content included in image frames most frequently is the primary topic of discussion. Further, video analytics may determine that commentary from the audio frame when the primary topic is displayed can be considered to be representative of the main point of the news story.

Figure 3:
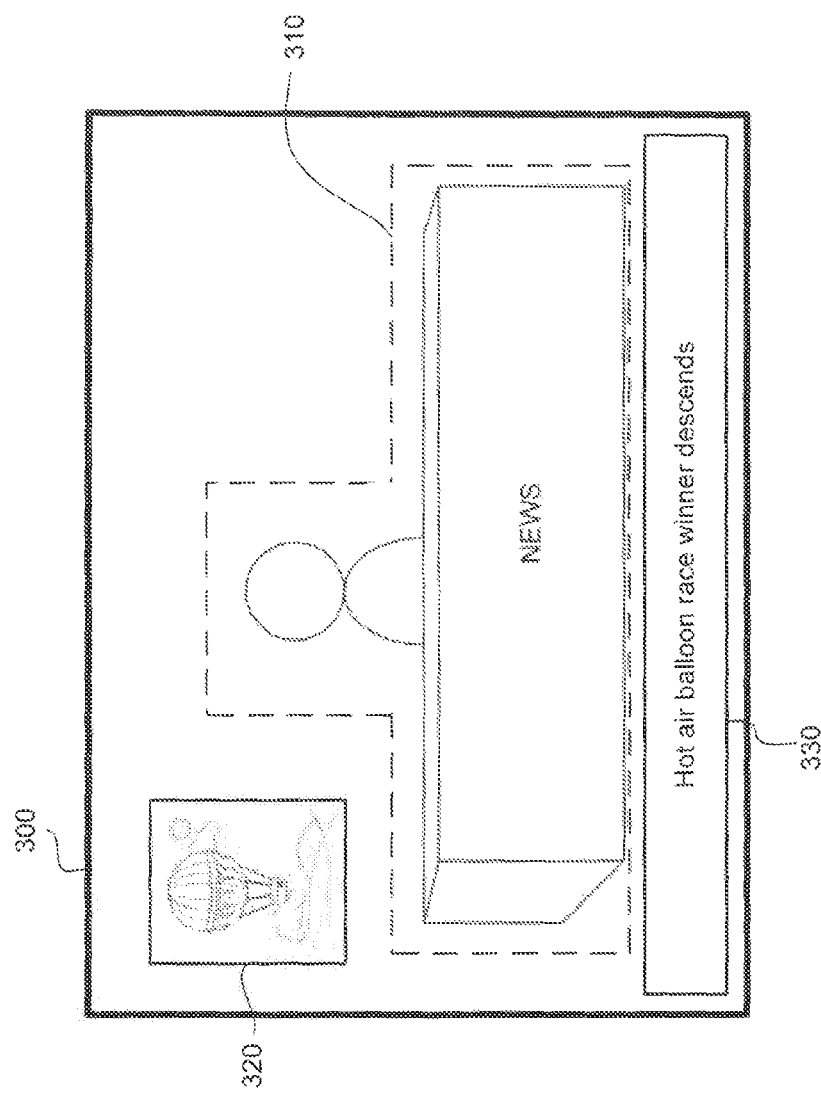
FIG. 3 illustrates an image frame of a video according to an example embodiment.

In some cases, image frames may include several areas where information may be obtained. For example, referring to FIG. 3, an image frame 300 may include a first area 310 that displays a commentator, a monitor area 320 that may display an image, and a text area 330 near the bottom of the screen, which may be a closed captioning stream of text, a live stock ticker, or other form of presented dynamic text or other information. Using video analytics, the areas 310-330 of the image frame 300 may be identified and analyzed separately or together.

Some embodiments may use an iterative analysis process by which certain aspects of the context windows (e.g., 220*a*) are extracted on a first pass, and subsequently after analyzing the initially extracted data, focus may be placed during a next pass on particular areas of interest within the image frames 222*a* or the audio frames 224*a* of the context window 220*a* based on the extracted data. In some cases, this iterative process can save processing power that would be otherwise associated with processing all of the content in the context window 220*a* during only one pass through the image and audio frames 222*a* and 224*a*. For example, during an initial pass, a subset of the image frames 222*a* of the context window 220*a* may be identified for further analysis. As another example, in some embodiments, the video analyzer 112 may use a first video analytic (e.g., an image processing algorithm) during an initial pass to identify a brand name within a portion of an image frame 222*a*. In addition, during a first pass, the video analyzer 112 may use a second video analytic (e.g., speech-to-text transcription) on a main audio channel of the audio frame 224*a* to determine certain aspects of the speech contained in the audio frame, and may analyze the text of the converted speech for content. In a subsequent pass, the video analyzer 112 may use a third video analytic (e.g., an image analysis technique different from the image processing algorithm) on the portion of the image frame 222*a* with the brand name for deeper analysis, or perform text processing on particular areas of interest of the analyzed text of the converted speech for indications of emotion and/or sentiment.

In some embodiments, the video analyzer 112 may analyze one or more image frames 222*a* and one or more audio frames 224*a* from a context window 220*a* simultaneously, such that the image frames 222*a* and the audio frames 224*a* may be processed together as a single concept or object. For example, in some implementations, the video analyzer 112 may convert the image frames 222*a* and the audio frames 224*a* (or portions of the image frames 222*a* and the audio frames 224*a*) into number vectors, and combine the number vectors into a model to process the context window. As a non-limiting example, the video analyzer 112 may identify faces that appear in the image frames 222*a*, and create vectors that identify particular faces. Meanwhile, in some embodiments, the video analyzer 112 only analyzes the image frames 222*a* and the audio frame 224*a* with the other.

Figure 4:
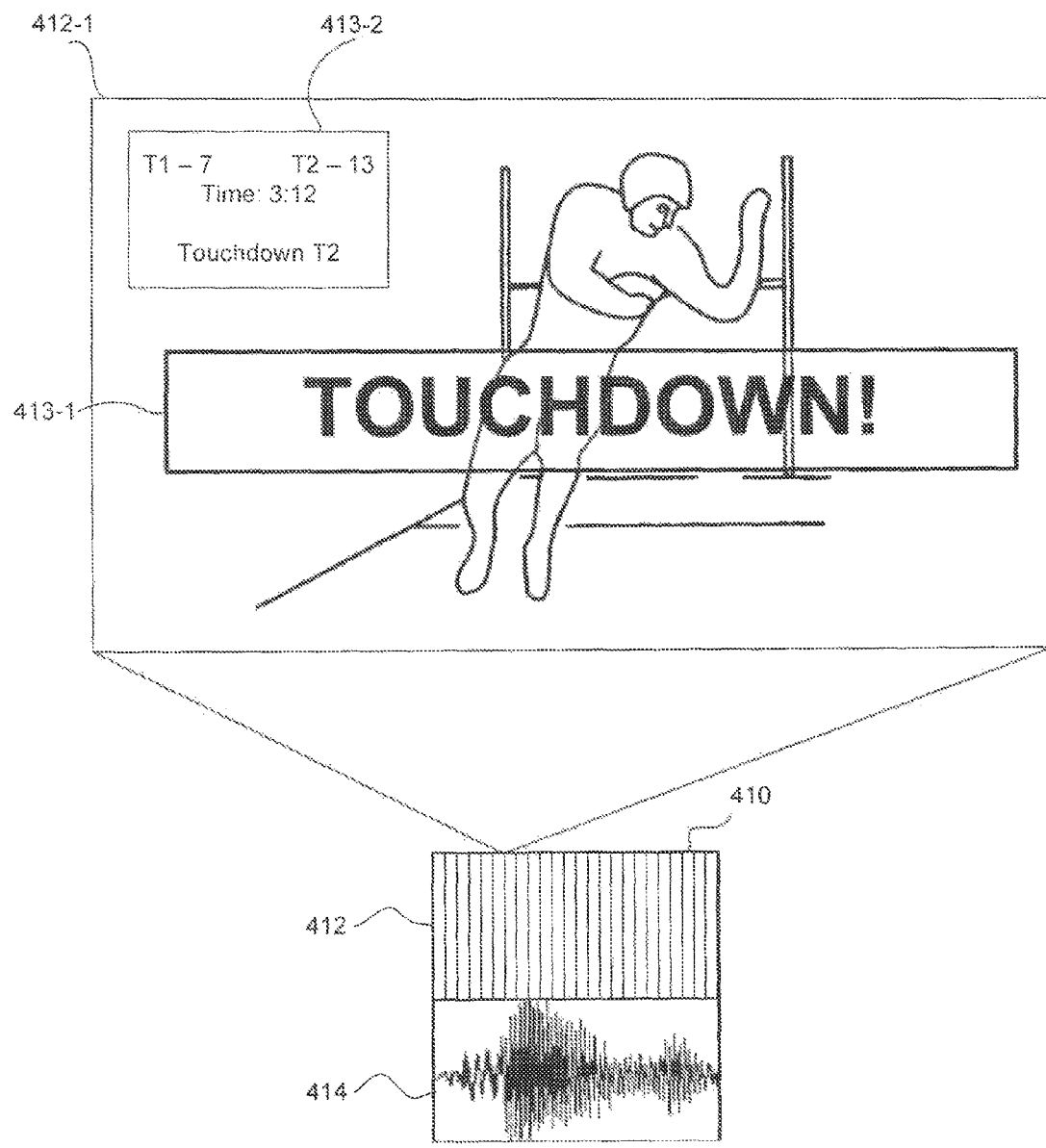
FIG. 4 illustrates a context window of a video broadcast according to an example embodiment.

As a non-limiting example, FIG. 4 illustrates a context window 410 of a video broadcast of a football game. If the context window contains image frames or audio frames of a team scoring a touchdown (e.g., the team scores a touchdown within or "during" the context window), there may be a large amount and degree of ambient crowd noise from cheering fans as seen in the audio frame 414. In some embodiments, the noise may obscure a commentator's voice describing the action. In some instances, an image frame 412-1 of image frames 412 may include a portion 413-1 of a visual indication that a touchdown has been scored, for example by displaying a flashing "Touchdown!" text image. In some embodiments, the physical stadiums in which the football games are played may display messages in certain parts of the physical location. These messages may be visible within certain portions 413-2 of the image frame 412. In some implementations, the video analyzer 112 may correlate large amounts of crowd noise-type audio patterns combined with simultaneously analyzed image frame 412-1 that may include identify visual identifiers 413-1 and 413-2 that a touchdown has been scored, to identify that a touchdown has been scored. Thus, one or more video analytics applied to the context window corresponding to the touchdown could yield a result that marks that time segment of the video or the context window as showing a touchdown scored. According to some examples, this resulting descriptor or other identifier (e.g., "touchdown scored") could be considered a characteristic of the context window 410. As will be described below in greater detail with reference to FIG. 5, the video analyzer 112 may create a local atomic unit corresponding to the context window 410, and derive attributes of the local atomic unit from the characteristics of the context window 410, which could be searched-for in a local video graph or global video graph by a user through a query.

In some embodiments, the system 110 may pre-process the video, for example, by identifying monitoring areas within the image frames. For example, the pre-processing may include detecting changes that occur on the image frames within the monitor area. As non-limiting examples, the system 110 may perform preprocessing using one or more of: a) histograms, b) timestamp changes (for audio bounding), and/or c) saving a monitor frame image. With respect to timestamp changes, as an example, if it is determined that an image x appeared on image frames in a monitor between times t=2 and t=3, speech recognition can be performed on an audio frame around the time window [2, 3] to extract what was being said at that time.

With respect to saving a monitor frame image, if a particular monitor image is deemed to be important, then it may be marked or extracted for further and/or future processing. For example, a plurality of monitor images marked as important may be compared, for example, using one or more of a) histograms, b) convolutional neural network similarity, and/or c) blur and hash. In some embodiments, the comparison may include identifying a most common image from the monitor area, and corresponding timestamps within the context window or the video. In some cases, the video analyzer 112 may use histograms to compare the raw pixels to one another, or a convolutional neural network to compare images on a more abstract level (e.g., an image frame including a picture of a Black Labrador and an image frame including a picture of a Husky might be deemed similar because they are both dogs).

In some embodiments, the video analyzer 112 may pre-process the audio frame by, for example, extracting audio between certain timestamps, automatic speech recognition (ASR) audio, or by performing speech-to-text transcription. In some embodiments, the video-analyzer 112 may extract a most common word from an audio frame of a context window, which may be used as an attribute of the corresponding local atomic unit of the local video graph.

In various embodiments, the video analyzer 112 extracts certain information from both the image frames and audio frame of a context window. For example, in some cases the video analyzer 112 may use a video analytic (e.g., image recognition) on the image frames to identify logos, faces, or other particular objects within the image frame. In some embodiments, the video analyzer may perform speech-to-text conversion on narration in the audio frame, and may identify, for example, a language spoken, a speaker, a speaker's accent classification (e.g., a speaker's accent), an emotion classification (e.g., anger) of the speech, censorship detection, or non-speech audio aspects such as music and/or ambient noises.

In some implementations, the video analyzer 112 may, as non-limiting examples, capture timestamps and information in particular areas of the image frames. As non-limiting examples, referring to FIG. 3, image frequency within area 320 may be monitored, text may be identified (for example within area 330), and scene transitions may be detected. In some embodiments, the video analyzer 112 may perform face detection or gesture detection (e.g., hand gestures made by a commentator) within area 310.

Figure 5:
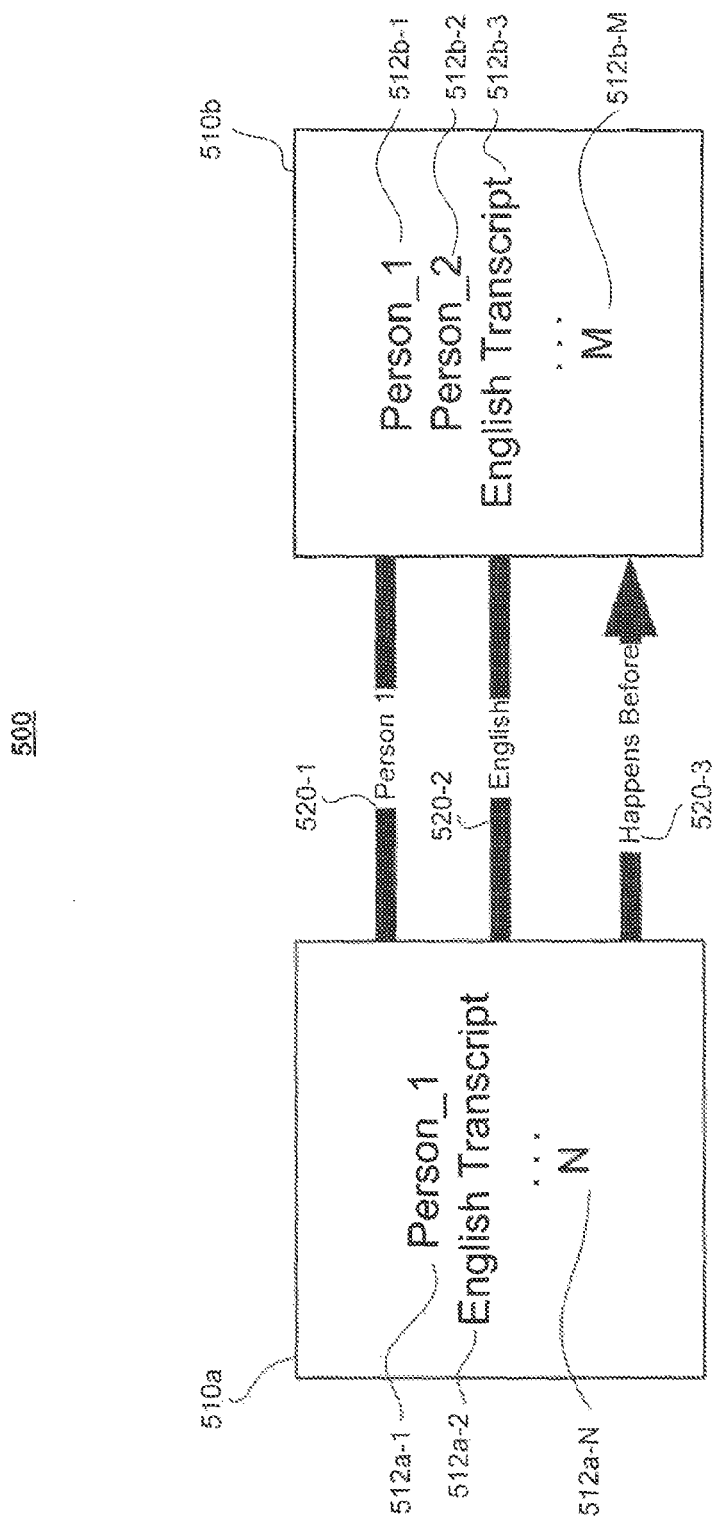
FIG. 5 is a representation of a local video graph according to an example embodiment.

The video analyzer 112 can utilize the information extracted or generated (i.e., characteristics) by analyzing the context windows 220a and 220b to generate corresponding local atomic units 510a and 510b (see FIG. 5). The video analyzer 112 may convert the characteristics into attributes 512a-1-512a-N and 512b-1-512b-M of the local atomic units 510a and 510b. As a non-limiting example, the video analyzer 112 may analyze aspects of scene transitions that occur within the image frames, together with the transcription of the audio frame (e.g. news commentator's narrative) and a classification of emotion of the speaker determined from the audio frame, to produce an attribute of a local atomic unit indicating the commentator's sentiment towards the subject of the content in the monitor area.

As another example, text in an image frame (e.g., area 330 in FIG. 3) that repeatedly concerns the Miss America Pageant, taken together with multiple instances of the news anchor mentioning Donald Trump (which may be determined by analyzing the text transcription of the audio frame), may be used to generate an attribute that makes a connection between the Miss America Pageant and Donald Trump being an owner or other party of interest.

FIG. 5 is a representation of a local video graph 500 according to an example embodiment. In some cases, the local video graph 500 encapsulates a single video into a graph structure. Referring to FIG. 5, the local atomic units 510a and 510b are provided to the local graph analyzer 114, which forms the local video graph 500. The local graph analyzer 114 applies edges 520-1-520-3 between the local atomic units 510a and 510b. The edges 520-1-520-3 represent relationships between the between the local atomic units 510a and 510b, for example, based on their attributes 512a-1-512a-N and 512b-1-512b-M. The local graph analyzer 114 may utilize one or more local graph analytics to generate and apply the edges 520-1-520-3 between the local atomic units 510a and 510b. As non-limiting examples, the edges 520-1-520-3 may be based on a particular connection between two different context windows, based on image classifications and object detection from analyzing image frames, spoken language detection, keyword spotting, and speaker detection from analyzing audio frames, and feature extraction in numerical or metadata form.

Referring to the example in FIG. 5, the local graph analyzer 114 generates edge 520-1 indicating that person 1 being detected is an attribute of both local atomic units 510a and 510b (indicating that person 1 was detected in the image frames 222a and 222b of both context windows 220a and 220b), edge 520-2 indicates that an English transcript is an attribute of both local atomic units 510a and 510b (indicating that English was spoken in the audio frames 224a and 224b of both context windows 220a and 220b), and edge 520-3 indicates that context window 220a corresponding to local atomic unit 510a occurs before context window 220b corresponding to local atomic unit 510b.

Figure 6:
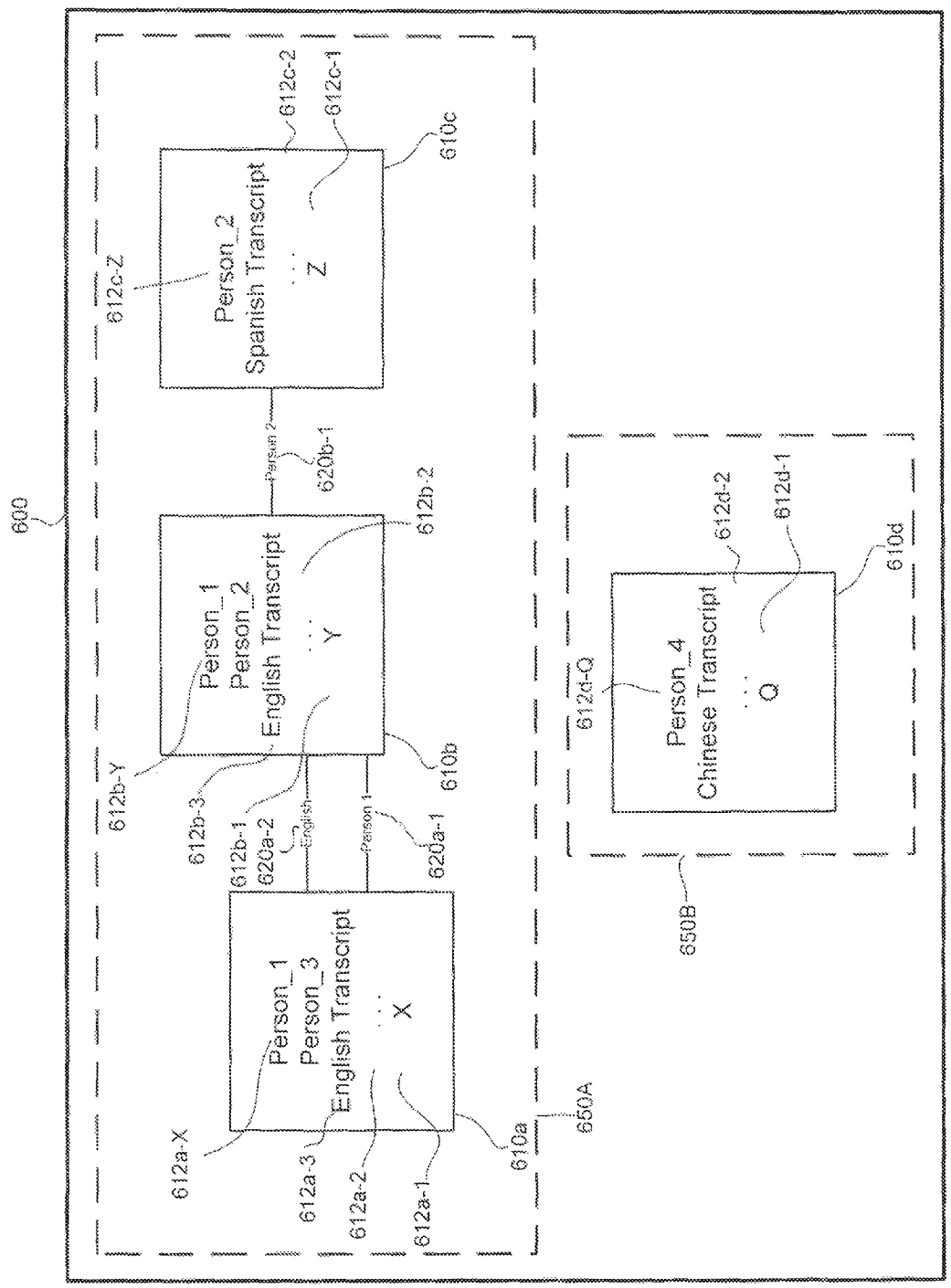
FIG. 6 is a representation of a global video graph according to an example embodiment.

A plurality of local video graphs 500 corresponding to different videos may be generated by the local graph analyzer 114 and provided to the global graph analyzer 116. Referring to FIG. 6, the global graph analyzer 116 may combine the local video graphs 500 into a global video graph 600 (which may also be referred to herein as a global media graph or global graph representation). As shown in FIG. 6, a global video graph 600 includes a plurality of global atomic units 610a-610d corresponding to four respective videos (which will be referred to as videos 1-4). The global graph analyzer 116 may extract and/or analyze attributes from the respective local atomic units of videos 1-4 and edges of the respective local video graphs to derive attributes of the respective global atomic units 610a-610d. A global atomic unit may represent a video (e.g., a local video graph) as a single node in the global video graph 600.

The global graph analyzer 114 applies edges 620a-1, 620a-2, and 620b-1 between the global atomic units 610a-610c. The edges 620a-1, 620a-2, and 620b-1 represent relationships between global atomic units 610a-610c, for example, based on their attributes 612a-1-612a-X, 612b-1-612b-Y, and 612c-1-612c-Z. The global graph analyzer 116 may utilize one or more global graph analytics to generate and apply the edges. As non-limiting examples, the edges 620a-1, 620a-2, and 620b-1 between global atomic units may provide insight into a collection of videos, such as by providing information regarding event detection, sentiment, opinion, or opinion change analysis, sequencing information, and summarization.

The global graph analyzer 116 may apply, between global atomic unit 610a and global atomic unit 610b, edge 620a-1 indicating that person 1 being detected is an attribute of the corresponding video 1 and video 2 and edge 620a-2 indicating that an English transcript is an attribute of both global atomic unit 610a and global atomic unit 610b (indicating that English was spoken within audio frames of both respective context windows). The global graph analyzer 116 may apply edge 620b-1 indicating that person 2 being detected is an attribute of videos 2 and 3 corresponding to global atomic units 610b and 610c, respectively. As can be seen with reference to the example in FIG. 6, no edges are applied between global analytic unit 610d and the remaining global analytic units 610a-610c. However, as the video analyzer 112 analyzes additional videos and the local graph analyzer 114 generates additional local video graphs, additional edges may be made between global analytic unit 610d and future global analytic units.

As mentioned in some detail above, nodes of a global video graph may not have edges between them. Referring again to FIG. 6, a portion 650A of the global video graph 600 includes global atomic units 610a, 610b, and 610c which are connected to one another by edges 620a-1, 620a-2, and 620b-1. Meanwhile, another portion 650B of the global video graph 600 includes global atomic unit 610d, which does not have edges connecting it to any node in the first portion 650A. One of ordinary skill will understand that the connections made between nodes of the global video graph 600 may be dependent upon current attributes of the respective global atomic units, and may be altered as different queries are performed or the global video graph 600 is updated, for example, as described below with reference to FIG. 8.

As non-limiting examples, attributes of the global atomic units 610-610d may include common attributes across all local atomic units of a corresponding local video graph (e.g., language detected: English), binary attributes over any or all local atomic units (e.g., was a face detected, yes/no, did anyone speak German yes/no, and were advertisements identified yes/no, and time-interval related attributes (e.g., English was spoken between these time intervals: [x,y]. and touchdowns occurred at these timestamps: x, y, z). The edges between the global atomic units may be based on attributes common between global atomic units, between a global atomic unit and a local atomic unit of another video, or between local atomic units of two different videos.

In some implementations, the attributes of the global atomic units 610a-610d may not be comprehensive of all attributes derived or derivable from the corresponding local video graph. Rather, in some cases, only a subset of derived or derivable attributes may be applied as attributes of the global atomic units 610a-610d. For example, some attributes of the local atomic units of the corresponding local video graph may not be represented in the global atomic unit.

The global video graph 600 may be stored in the graph storage device 118. As the video analyzer 112 analyzes additional videos and the local graph analyzer 114 generates additional local video graphs, the global graph analyzer 116 may update the global graph 600 stored in the graph storage 118. In some cases, at least one of the video analyzer 112, the local graph analyzer 114, and the global graph analyzer 116 may use additional video analytics, local graph analytics, or global graph analytics, respectively, after the global video graph 600 is developed. In these cases, the global graph analyzer 116 may update the global video graph 600 by, for example, updating attributes of the global atomic units or edges between the global atomic units. In some cases, the updating the attributes may include removing certain attributes from the global atomic units.

Figure 7:
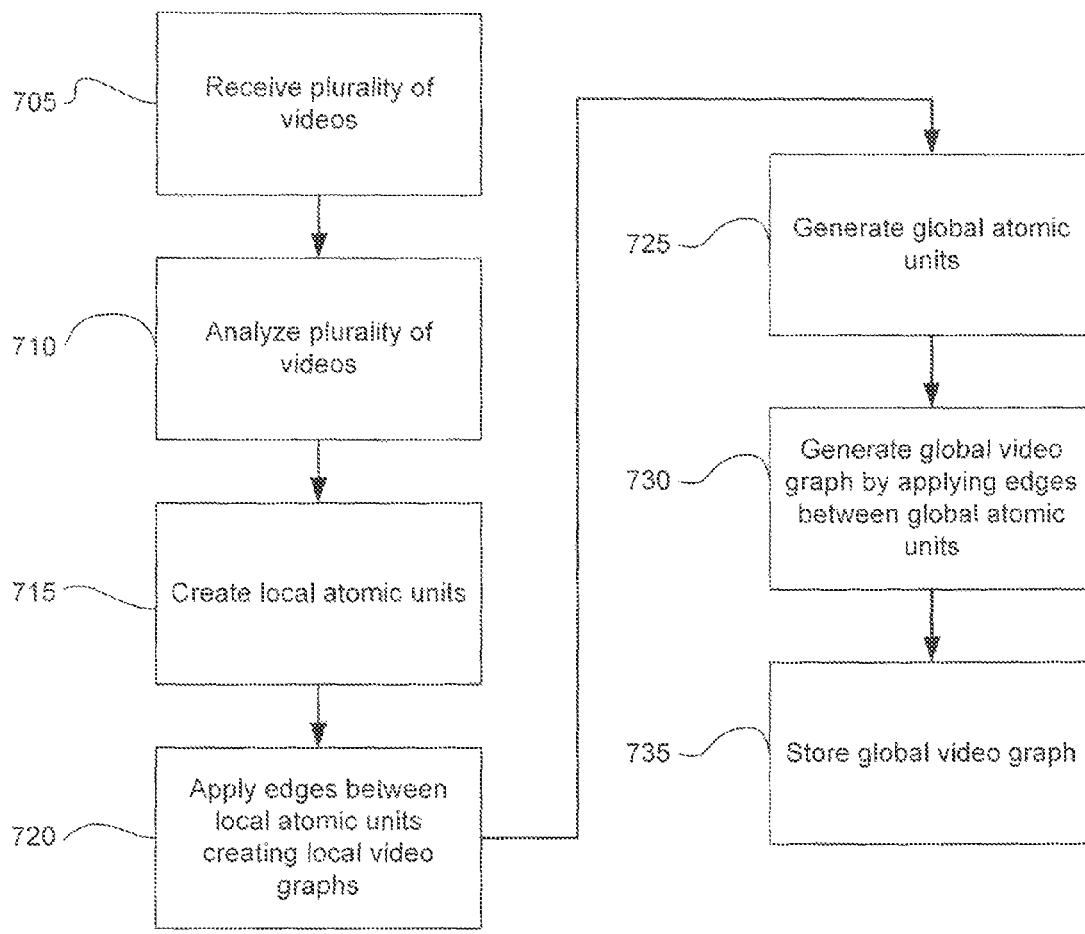
FIG. 7 is a flowchart of developing a global video graph according to an example embodiment.

FIG. 7 is a flowchart of a method 700 for developing a global video graph according to an example embodiment. In some embodiments, the method 700 may be implemented by the system 110 shown in FIG. 1. Referring to FIG. 7, the method 700 may include receiving 705 (e.g., by a video analyzer 112) a plurality of videos. As non-limiting examples, the plurality of videos may be received by crawling a network to detect videos, by navigating to the plurality of videos, by receiving a transmission containing the plurality of videos from one or more video sources, or by some combination thereof.

The video analyzer 112 may then analyze 710 the plurality of videos to identify or derive characteristics of the video. In some embodiments, the video analyzer 112 may define one or more context windows for each video, and analyze 710 respective image frames or audio frames contained in the context windows. The analyzer 112 may create 715 one or more local atomic units corresponding to context windows with one or more attributes, for example, corresponding to information derived from the analyzing 710.

The method may further include applying 720 (e.g., by a local graph analyzer 114) edges between the one or more context windows for the individual videos creating respective local video graphs corresponding to respective individual videos. For example, the local graph analyzer 114 may apply 720 edges indicating relationships between context windows based on, as a non-limiting example, the attributes of the context windows.

In some embodiments, the method may include generating 720 (e.g., by the global graph analyzer 116) global atomic units corresponding to the respective local video graphs. In some cases, the global atomic units may represent a video as a single node. The global graph analyzer 116 may derive attributes of the global atomic units by analyzing the local video graph (i.e., the local attribute units and the local graph edges). The global graph analyzer 116 may further generate 730 a global video graph from the plurality of local video graphs. The global graph analyzer 116 may apply edges between the global atomic units, for example, based on relationships between their attributes.

The method may further include storing 735 the global video graph (e.g., in a graph storage). The global video graph may encapsulate relationships between distinct videos into a graph structure. The global video graph may, in some cases, be thought of as a graph of graphs (e.g., where each node of the global video graph is a local video graph).

Figure 8:
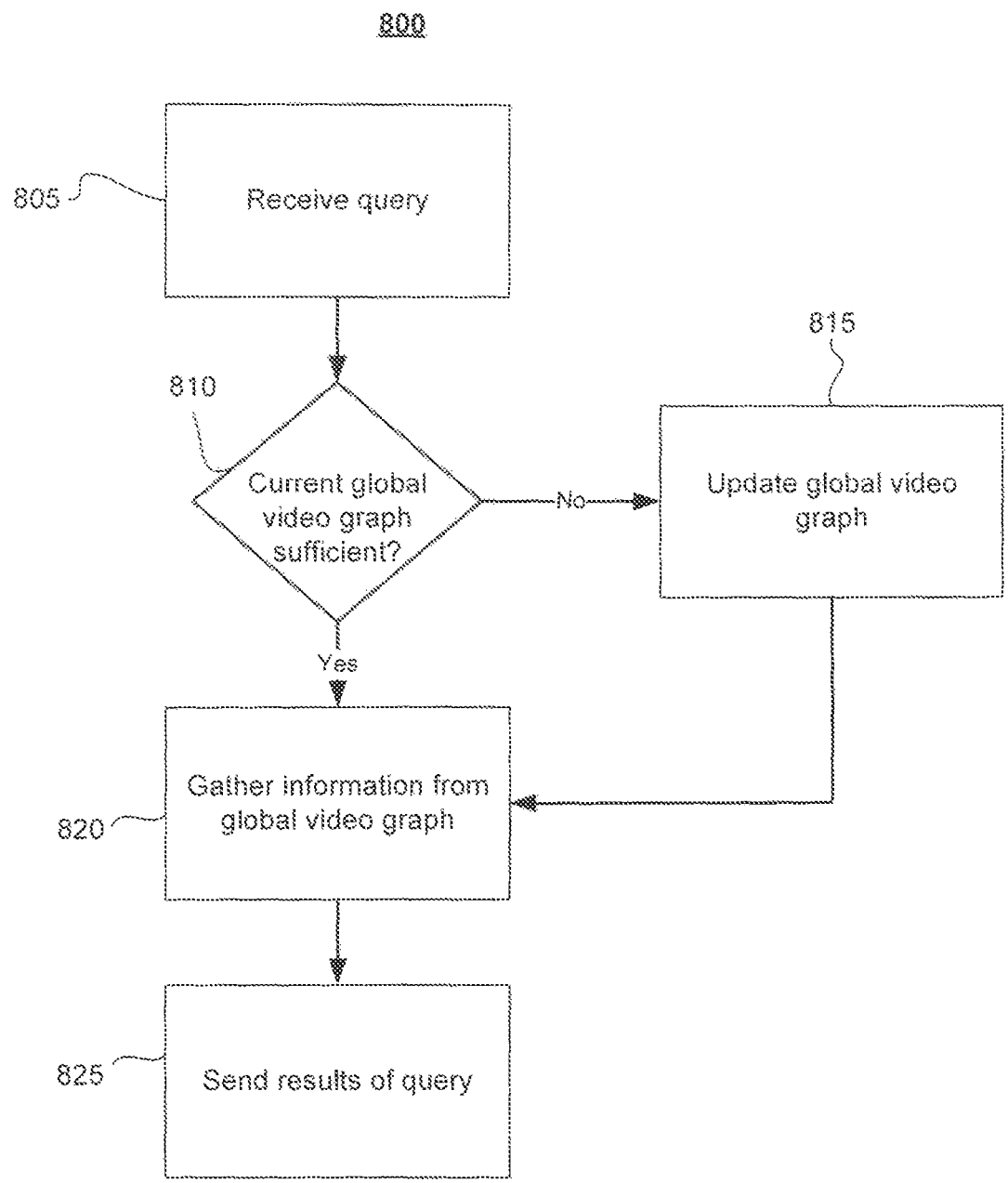
FIG. 8 is a flowchart of responding to a query according to an example embodiment.

FIG. 8 is a flowchart of a method 800 for responding to a query according to an example embodiment. As a non-limiting example, a user device (e.g., computing device 120)

may transmit the query to the system 110, and the method 800 may be performed by the system 110. In some embodiments, the query may be directed towards content of the video (e.g., the video portions for which a touchdown occurs), attributes of the video (e.g., identification of videos that contain a touchdown), and features of the video (e.g., requesting the numerical representations underlying the detection of a touchdown occurrence).

Referring to FIG. 8, the system 110 receives 805 a query for information on a collection of videos. For example, the query may request "videos with person X speaking language Y." The system 110 may determine 810 whether the current global video graph is sufficient to produce a response to the query (in the example, whether the global atomic units indicate whether person X is present and speaking language Y).

If an analysis of the global video graph cannot fully answer the query (810—No), the system 110 updates 815 the global video graph. For example, the video analyzer 112 may perform video analytics on the plurality of videos to extract the necessary information (e.g., by identifying speakers and their languages) and either create new context windows and local atomic units or update the attributes of local atomic units, the local graph analyzer 114 may apply edges between the context windows of individual videos describing new relationships, and the global graph analyzer 116 may update the attributes of global atomic units and apply new edges between the global atomic units. Updating 815 the global video graph may be similar to the method described above in FIG. 7 with reference to blocks 710-725. Accordingly, a detailed description will not be repeated for brevity.

In some embodiments, the global video graph may be updated only to the extent necessary to answer the query. For example, if the global atomic units of the global video graph indicate which nodes include person X, only the global atomic units including person X will be analyzed to determine if person X speaks language Y. In some embodiments, one or more attributes of the global atomic units may be removed and stored in a reference database. The removed attributes may later be added back into the local atomic units by referencing the database in order to update the global video graph without performing additional analytics on the videos.

If the current global video graph is sufficient to answer the query (810—Yes), then the method 800 may further include gathering 820 (e.g., by the system 110) information from the global video graph to answer the query (e.g., identifying videos or portions of videos "with person X speaking language Y"). In some cases, the gathering 820 may include using deep learning to provide enhanced results. Referring to the example query, the deep learning may also identify videos or portions of videos with person X speaking language Z, or language Y being used by someone speaking to person X. Then, the results (response to query) are sent back 825 to the querying device (e.g. computing device 120).

The results of a query may be based on the type of query or the implementation of the present disclosure. As non-limiting examples: the results may formatted as a structured text file that can be parsed or analyzed using various methods as would be understood by one of ordinary skill; the results may be represented by a list of videos or portions of videos; and the results may include timestamp tags or links to videos matching the query. The format of the results is not limited to these provided examples, and one of ordinary skill will recognize various forms and data formats may be used.

As a non-limiting example, a computing device 120 may transmit a query to the system 110, and the method 800 may be performed by the system 110. Referring to FIG. 8, the system 110 receives 805 the query for information on a collection of videos. For example, the query may request "videos with person X speaking language Y." The system 110 may determine 810 whether the current global video graph is sufficient to produce a response to the query (in the example, whether the global atomic units indicate whether person X is present and speaking language Y).

Figure 9:
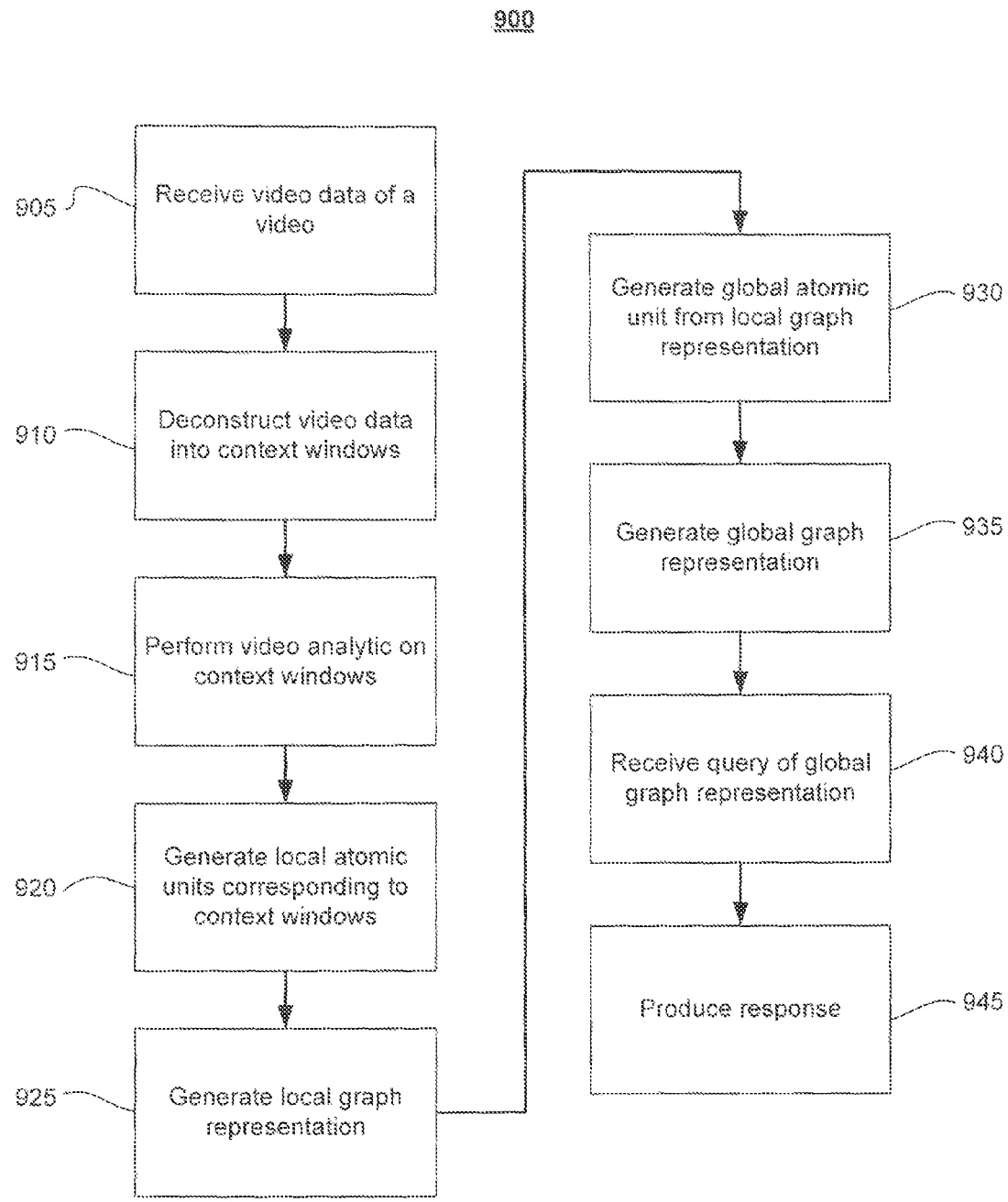
FIG. 9 is a flowchart of a method according to an example embodiment.

FIG. 9 is a flowchart of a method 900 according to an example embodiment. The method 900 may be performed, for example, by the system 110. The method 900 may include receiving 905 video data of a video. The video data of the video can be deconstructed 910 into a plurality of context windows (for example, by the video analyzer 112). Each of the context windows may have an image frame of a segment of the video from the video data and/or an audio frame of a segment of the video from the video data.

One or more video analytics may be performed 1015 on the context windows to identify or derive one or more characteristics of the respective context windows. For example, the video analyzer 112 may perform 1015 a first video analytic function on an image frame of the context window to identify one or more characteristics of the context window associated with image-related content of the first video. The video analyzer 112 may further perform 1015 a second video analytic function on an audio frame of the context window to identify one or more characteristics of the context window associated with audio-related content of the first video. In some embodiments, the video analyzer 112 may further perform a third video analytic on the characteristics of the image-related content and/or the characteristics of the audio-related content to generate additional characteristics of the context window.

The method 900 may further include generating 920 (e.g., by the video analyzer 112) a plurality of local atomic units including attributes derived from the identified one or more characteristics of the respective context window. A local graph representation of the video may then be generated 925 (e.g., by the local graph analyzer 114). The local graph representation may include a plurality of nodes corresponding to the local atomic units. For example, the local graph analyzer 114 may apply local graph edges connecting the plurality of nodes to each other based, at least in part, on the attributes of the corresponding local atomic units.

In some embodiments, a global atomic unit may be generated 930 (e.g., by global graph analyzer 116) including attributes derived from the local graph representation. In some embodiments, the global atomic unit may include a compilation of all attributes of the local atomic units of the local graph representation. However, this is merely an example, and the global graph analyzer 116 may, as non-limiting alternatives, utilize a subset of the attributes of the local atomic units, add attributes based on the local graph edges of the local graph representation, and derive attributes from the local atomic units and local graph edges.

A global graph representation may be generated 935 of a plurality of videos (e.g., by the global graph analyzer 116). The global graph representation may include a first node corresponding to the global atomic unit corresponding to the received video data and a plurality of second nodes corresponding to respective global atomic units of respective other videos. The generating 935 of the global graph representation may include applying global graph edges representing relationships between the connected nodes based, at least in part, on the attributes of the corresponding global atomic units.

The method 900 may further include receiving 940, e.g., from computing device 120, a query of the global graph representation for information associated with content of the plurality of videos. The query may be received 940 from a device external to the system, or may be generated from user commands into the system 110, for example. A response may be produced 945 in response to the query, by analyzing the global graph representation. The response may include the information associated with the content of the plurality of videos.

Aspects of deep learning (which may also be referred to herein as "neural-network based") utilized in accordance with some embodiments of the present disclosure will now be described in further detail. As known to those skilled in the art, "deep learning" can refer to a branch of machine learning that is based on algorithms for modeling high-level abstractions in data by the use of multiple processing layers. Deep learning architectures used in various embodiments described herein include neural networks. A neural network generally comprises a plurality of layers of neural nodes (i.e., "neurons"), wherein the layers can include an input layer, a hidden layer, and an output layer. A neural network may consist of hundreds, thousands, millions, or more nodes in each of the input, hidden, and output layers. Further, neural networks may have a single hidden layer (for example, including two or more layers existing in parallel) or may have multiple hidden layers.

In accordance with various embodiments of the present disclosure, neural networks can be composed of three constituent components: fully connected layers, convolutional neural network layers, and recurrent neural network layers. As an example, in some embodiments fully connected layers may be considered classifiers. Given a previous layers' input, a fully connected layer may classify what it detected (e.g., "saw" or "heard") and pass that along to the next layer. In a practical sense, a fully connected layer may be used as a network's output classifier. For example, the last layer in a speech-to-text network may output to probabilities of a letter of the alphabet. Convolutional neural network layers can learn spatial relationships present in the data. Because of this, they may be heavily used in image classification (e.g., video analytics applied to image frames) and also may be used in speech and audio classification (e.g., video analytics applied to audio frames). Recurrent neural networks can be employed to model short and long-term sequential dependencies in data. As such, they can be instrumental in modeling speech and language-related data, given that those subjects can innately have a sequential structure.

Deep learning models can be trained by supervised and/or unsupervised learning. Supervised learning requires labeled data, such that for each input of data received during training, there is a corresponding correct target or label. This labeled data can allow a model to learn the correct method of prediction but still generalize to input data it has never seen before. In contrast, unsupervised learning can involve learning properties about data without the use of associated labels. Unsupervised learning can be particularly useful when one desires to learn about the underlying structure of presented data.

In some embodiments, unsupervised learning can be used to generate novel data, for example, based on the image frames and audio frames. As a non-limiting example, consider a context window having an audio frame with excessive background. A neural network-based model may be used to generate a cleaner audio frame (e.g., by cleaning up or filtering out some of the background noise). The cleaned audio frame may be used in a newly generated context window that may overlap existing context windows of the video.

Numerical output values of various deep learning architectures, in accordance with one or more embodiments of the present disclosure, can be used for generating attributes of local analytic units. For example, a deep learning model that has been trained for image classification can analyze one or more image frames and output descriptions for images of classes that it was not trained on. These descriptions can be used to distinguish similarities and differences between sequences of image frames. For example, a measure of the likeness between two image frames can distinguish the image frames without necessarily knowing the content of the image frames. In addition, deep learning can also be applied to audio frames, for example to model speech.

In some cases, speech-to-text deep learning networks may contain information regarding the context, tone, or other speech qualities of the audio frames. In some embodiments, the output of the deep learning may create "fingerprints" of the context windows (e.g., image frames and audio frames). Similarities between fingerprints of different context windows may indicate the presence of a same individual in different context windows without knowing the identity of the exact individual. For example, video analytics may be used to generate one or more vectors representing a face of an individual present in image frames in different context windows. For instance, if the local graph analyzer 114 determines that the vectors are the same within a predetermined threshold, it may be determined that the same individual is in both image frames. In some embodiments, binary representations of the extracted information may establish commonalities within a single context window or even between multiple context windows.

In one or more embodiments of the present disclosure, one or more aspects of neural networks as described above can be used in conjunction with one another. As an example implementation, an audio frame may include many spoken languages present. A single model may not be able to transcribe all languages natively, so the language present at any given time within the audio frame needs to be classified. Information regarding what language is present may be taken directly from a modified speech-to-text model and further supplemented with image recognition for individuals associated with different languages in temporally corresponding image frames. Once a language has been established, the audio frame may be processed by a model trained to transcribe that particular language. Another example implementation relates to speaker validation. If image data derived from image frames suggests that only a man is present on screen, for example, spoken audio data from a temporally corresponding audio frame may more likely be associated with the man. To determine whether that is the case, a speech model may be leveraged to classify whether the current speech in the audio frame is from a male or female voice. In this way, in some cases models may work concurrently to validate information before it is further processed or output for a final evaluation.

Neural networks in accordance with one or more embodiments of the present disclosure may be computer-implemented. The plurality of layers and nodes may reside in executable program modules (e.g., program modules 1014 in FIG. 10) or other software constructs, or in dedicated programmed hardware components. The layers and nodes, and other functional components described herein in accordance with various embodiments for computing on video data using deep learning may be stored in memory devices (e.g., memory 1004 or mass storage 1012) and executable by processors (e.g. processing unit 1002) of one or more computers, such as the computer 1000 shown in FIG. 10. Analyses, data processing, and other functions associated with operating the layers and nodes and performing the various neural language modeling functions described herein may be caused by the execution of instructions by one or more such processors.

Figure 10:
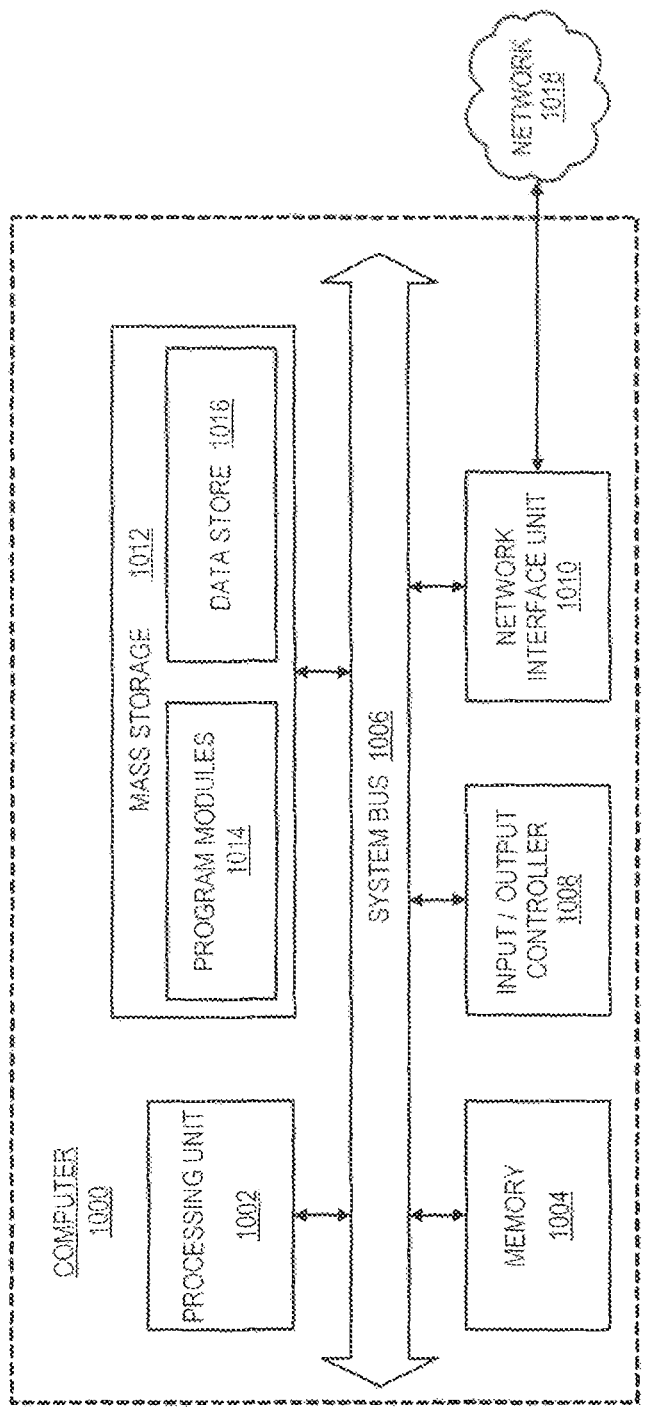
FIG. 10 illustrates an example computer architecture of a computing system according to one or more example embodiments.

Training functions, such as model training processes as may be described herein, may be performed in conjunction with interactions of one or more users with one or more computers, such as the computer 1000 of FIG. 10, and may be operated and configured such that trainable models can be improved based on the interaction of the users with training data and prior models, and can be implemented on various data in accordance with machine learning that may be supervised and/or autonomous. While some systems and functionalities for performing analysis on video data, and local and global graph representations thereof, are discussed above in the context of "deep learning" or particular types of "neural networks", it should be appreciated that other types of model-based approaches such as other machine learning processes, whether supervised and/or supervised that are existing or to be developed, may be used in performing such functions.

FIG. 10 is a computer architecture diagram showing a general computing system capable of implementing one or more embodiments of the present disclosure described herein. A computer 1000 may be configured to perform one or more functions associated with embodiments illustrated in one or more of FIGS. 1-9. It should be appreciated that the computer 1000 may be implemented within a single computing device or a computing system formed with multiple connected computing devices. For example, the computer 1000 may be configured for a server computer, desktop computer, laptop computer, or mobile computing device such as a smartphone or tablet computer, or the computer 1000 may be configured to perform various distributed computing tasks, which may distribute processing and/or storage resources among the multiple devices.

As shown, the computer 1000 includes a processing unit 1002, a system memory 1004, and a system bus 1006 that couples the memory 1004 to the processing unit 1002. The computer 1000 further includes a mass storage device 1012 for storing program modules. The program modules 1014 may include modules executable to perform one or more functions associated with embodiments illustrated in one or more of FIGS. 1-9. The mass storage device 1012 further includes a data store 1016. Unified knowledge representations as described above in accordance with some embodiments of the present disclosure may be stored in the mass storage device 1012.

The mass storage device 1012 is connected to the processing unit 1002 through a mass storage controller (not shown) connected to the bus 1006. The mass storage device 1012 and its associated computer storage media provide non-volatile storage for the computer 1000. By way of example, and not limitation, computer-readable storage media (also referred to herein as "computer-readable storage medium" or "computer-storage media" or "computer-storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1000. Computer-readable storage media as described herein does not include transitory signals.

According to various embodiments, the computer 1000 may operate in a networked environment using connections to other local or remote computers through a network 1018 via a network interface unit 1010 connected to the bus 1006. The network interface unit 1010 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 1000 may also include an input/output controller 1008 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface, for managing various functions performed by the computer 1000.

The bus 1006 may enable the processing unit 1002 to read code and/or data to/from the mass storage device 1012 or other computer-storage media. The computer-storage media may represent apparatus in the form of storage elements that are implemented using any suitable technology, including but not limited to semiconductors, magnetic materials, optics, or the like. The program modules 1014 may include software instructions that, when loaded into the processing unit 1002 and executed, cause the computer 1000 to provide functions associated with embodiments illustrated in FIGS. 1-9. The program modules 1014 may also provide various tools or techniques by which the computer 1000 may participate within the overall systems or operating environments using the components, flows, and data structures discussed throughout this description. In general, the program module 1014 may, when loaded into the processing unit 1002 and executed, transform the processing unit 1002 and the overall computer 1000 from a general-purpose computing system into a special-purpose computing system.

The processing unit 1002 may be constructed from any number of transistors or other discrete circuit elements, which may individually or collectively assume any number of states. More specifically, the processing unit 1002 may operate as a finite-state machine, in response to executable instructions contained within the program modules 1014. These computer-executable instructions may transform the processing unit 1002 by specifying how the processing unit 1002 transitions between states, thereby transforming the transistors or other discrete hardware elements constituting the processing unit 1002. Encoding the program modules 1014 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 1014 may transform the physical state of the semiconductor memory, when the software is encoded therein. For example, the program modules 1014 may transform the state of transistors, capacitors, or other discrete circuit elements constituting the semiconductor memory.

As another example, the computer-storage media may be implemented using magnetic or optical technology. In such implementations, the program modules 1014 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

According to some implementations, computer program code may be configured to control a computer device to implement one or more components of the system 110 (e.g., the video analyzer 112, the local graph analyzer 114, the global graph analyzer 116, and the graph storage 118). According to some implementations, computer program code may be configured to control a computer device implement one or more methods within the scope of the present disclosure.

Although some example embodiments described herein have been described in language specific to computer structural features, methodological acts, and by computer readable media (e.g., non-transitory computer readable media), it is to be understood that the disclosure is not necessarily limited to the specific structures, acts or media described. Therefore, the specific structural features, acts and mediums are disclosed as example embodiments implementing the disclosure. The present disclosure is intended to cover various modifications and equivalent arrangements including those within the scope of the appended claims and their equivalents. Although specific terms are employed herein, they are used in a generic and descriptive sense only and not for purposes of limitation.

The various embodiments described above are provided by way of illustration only and should not be construed to limit the scope of the present disclosure. Those skilled in the art will readily recognize various modifications and changes that may be made to the present disclosure without following the example embodiments and applications illustrated and described herein, and without departing from the spirit and scope of the present disclosure and its equivalents as set forth in the appended claims. Where methods have been described having certain elements, the order of elements may be altered unless a particular order is necessarilly required.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method, comprising:
    receiving video data for a first video;
    deconstructing the video data of the first video into a plurality of context windows, wherein each of the context windows comprises at least one of:
        an image frame of a segment of the first video from the video data, and
        an audio frame of a segment the first video from the video data;
    performing, on each context window of the plurality of context windows that includes an image frame, a video analytic function on the image frame to identify one or more characteristics of the context window that are associated with image-related content of the first video, wherein performing the video analytic function on the image frame comprises utilizing a neural-network based analysis to perform at least one of object detection, object localization, caption generation, and segmentation;
    performing, on each context window of the plurality of context windows that includes an audio frame, a video analytic function on the audio frame to identify one or more characteristics of the context window that are associated with audio-related content of the first video, wherein performing the video analytic function on the audio frame comprises utilizing a neural-network based analysis to perform at least one of language detection, transcription, speaker diarization, and tonal analysis;
    generating, for each of the plurality of context windows, a respective local atomic unit comprising attributes derived from the identified one or more characteristics of the respective context window, to form a plurality of local atomic units;
    generating a local graph representation of the first video, comprising a plurality of nodes corresponding to the plurality of local atomic units, wherein generating the local graph representation comprises applying local graph edges connecting the plurality of nodes to each other, wherein the local graph edges represent relationships between the connected nodes based, at least in part, on the attributes of the corresponding local atomic units;
    generating a global graph representation of a plurality of videos that includes the first video;
    receiving a query of the global graph representation for information associated with content of the plurality of videos; and
    producing, in response to the query and by analyzing the global graph representation, a response including the information associated with the content of the plurality of videos.

2. The method of claim 1, further comprising:
    generating a global atomic unit comprising the local graph representation and attributes derived from the local graph representation,
    wherein the global graph representation includes a first node corresponding to the global atomic unit corresponding to the first video and a plurality of second nodes corresponding to respective global atomic units of respective second videos of the plurality of videos, and wherein generating the global graph representation of the plurality of videos comprises applying global graph edges connecting the plurality of nodes to each other, the global graph edges representing relationships between the connected nodes based, at least in part, on the attributes of the corresponding global atomic units.

3. The method of claim 1, wherein the query is for information on videos of the plurality of videos wherein a particular object or person is present.

4. The method of claim 1, wherein the query is for information on videos of the plurality of videos wherein a particular language is being spoken.

5. The method of claim 1, wherein at least one of the plurality of context windows that comprises an image frame is comprised of:
 a plurality of image frames from a continuous portion of the first video, or
 a plurality of image frames from discontinuous portions of the first video.

6. The method of claim 1, wherein at least one of the plurality of context windows that comprises an audio frame is comprised of:
 an audio frame from a continuous portion of the first video, or
 a plurality of audio frames from discontinuous portions of the first video.

7. The method of claim 1, wherein the video analytic function comprises performing, on the image frame, at least one of image classification, object identification, and text detection.

8. The method of claim 1, wherein the video analytic function comprises performing, on the audio frame, at least one of speech-to-text transcription, noise analysis, generating a cleaner audio frame, and speaker identification.

9. The method of claim 1, wherein performing the video analytic function comprises:
 converting the image frames to first number vectors and converting the audio frames into separate, second number vectors; and
 combining the first number vectors and second number vectors into a model for processing a context window.

10. The method of claim 1, wherein
 performing the video analytic function on the image frame comprises a neural-network based analysis to determine the content of the image frame, and
 performing the video analytic function on the audio frame comprises performing a neural-network based analysis to determine the content of the audio frame.

11. The method of claim 1, wherein at least one of the local graph edges representing relationships between one local atomic unit with another local atomic unit corresponds to a relationship wherein:
 a same person or object is detected in both a context window corresponding to the one local atomic unit and a context window corresponding to the other local atomic unit,
 a context window corresponding to the one local atomic unit occurs prior in time to a context window corresponding to the other local atomic unit, or
 the same language is being spoken in a context window corresponding to the one local atomic unit and a context window corresponding to the other local atomic unit.

12. The method of claim 1, wherein receiving the video data comprises simultaneously receiving, from a plurality of media input channels, at least one of image data corresponding to the image frames and audio data corresponding to the audio frames.

13. The method of claim 1, wherein producing the response comprises:

generating a global atomic unit comprising attributes derived from the local graph representation, wherein the global graph representation includes a first node corresponding to the global atomic unit corresponding to the first video and a plurality of second nodes corresponding to respective global atomic units of respective second videos of the plurality of videos; and updating, in response to determining that the global graph representation cannot answer the query, the global graph representation to include at least one additional characteristic of at least one video of the plurality of videos; and producing the response by analyzing the updated global graph representation.

14. The method of claim 13, wherein updating the global graph representation comprises:
 performing, on at least one context window of the plurality of context windows of the first video, at least one additional video analytic function to identify one or more additional characteristics of the at least one context window;
 adding, to at least one respective local atomic unit corresponding to the at least one context window, one or more additional attributes corresponding to the identified one or more additional characteristics; and
 updating the local graph edges of the local graph representation of the first video, based at least in part on the one or more additional attributes.

15. The method of claim 13, wherein the updating the global graph representation comprises:
 deconstructing the video data of the first video into at least one additional context window;
 performing, on the at least one additional context window, the video analytic to identify one or more characteristics of the at least one additional context window;
 generating, for each of the at least one additional context window, a respective local atomic unit comprising attributes corresponding to the identified one or more characteristics of the respective additional context window to form at least one additional local atomic units;
 adding, to the local graph representation of the first video, at least one additional node corresponding to the at least one additional local atomic units; and
 updating the local graph edges of the local graph representation connecting the plurality of nodes to each other based, at least in part, on the attributes of the at least one additional local atomic units.

16. The method of claim 13, wherein the updating the global graph representation comprises:
 performing, on a characteristic of at least one context window of the plurality of context windows of the first video, at least one additional video analytic function to derive one or more additional characteristics of the at least one context window;
 adding, to at least one respective local atomic unit corresponding to the at least one context window, one or more additional attributes corresponding to the identified one or more additional characteristics; and
 updating the local graph edges of the local graph representation of the first video, based at least in part on the one or more additional attributes.

17. A system, comprising:
 one or more processors;
 a memory device operatively coupled to the one or more processors and storing instructions which, cause the system to perform functions that comprise:
 receiving video data for a first video;

deconstructing the video data of the first video into a plurality of context windows, wherein each of the context windows comprises at least one of:
an image frame of a segment of the first video from the video data, and
an audio frame of a segment the first video from the video data;
performing, on each context window of the plurality of context windows that includes an image frame, a video analytic function on the image frame to identify one or more characteristics of the context window that are associated with image-related content of the first video;
performing, on each context window of the plurality of context windows that includes an audio frame, a video analytic function on the audio frame to identify one or more characteristics of the context window that are associated with audio-related content of the first video;
generating, for each of the plurality of context windows, a respective local atomic unit comprising attributes derived from the identified one or more characteristics of the respective context window, to form a plurality of local atomic units;
generating a local graph representation of the first video, comprising a plurality of nodes corresponding to the plurality of local atomic units, wherein generating the local graph representation comprises applying local graph edges connecting the plurality of nodes to each other, wherein the local graph edges represent relationships between the connected nodes based, at least in part, on the attributes of the corresponding local atomic units;
generating a global graph representation of a plurality of videos that includes the first video, wherein nodes of the global graph representation are derived from respective local graph representations of respective videos of the plurality of videos;
receiving a query of the global graph representation for information associated with content of the plurality of videos; and
producing, in response to the query and by analyzing the global graph representation, a response including the information associated with the content of the plurality of videos.

18. The system of claim 17, wherein the functions performed by the system further comprise:
generating a global atomic unit comprising attributes derived from the local graph representation,
wherein the global graph representation includes a first node corresponding to the global atomic unit corresponding to the first video and a plurality of second nodes corresponding to respective global atomic units of respective second videos of the plurality of videos, and wherein generating the global graph representation of the plurality of videos comprises applying global graph edges connecting the plurality of nodes to each other, the global graph edges representing relationships between the connected nodes based, at least in part, on the attributes of the corresponding global atomic units.

19. A non-transitory computer-readable medium storing instructions which, when executed by one or more processors, cause one or more computing devices to perform functions that comprise:
receiving video data for a first video;
deconstructing the video data of the first video into a plurality of context windows, wherein each of the context windows comprises at least one of:
an image frame of a segment of the first video from the video data, and
an audio frame of a segment the first video from the video data;
performing, on each context window of the plurality of context windows that includes an image frame, a video analytic function on the image frame to identify one or more characteristics of the context window that are associated with image-related content of the first video;
performing, on each context window of the plurality of context windows that includes an audio frame, a video analytic function on the audio frame to identify one or more characteristics of the context window that are associated with audio-related content of the first video;
generating, for each of the plurality of context windows, a respective local atomic unit comprising attributes derived from the identified one or more characteristics of the respective context window, to form a plurality of local atomic units;
generating a local graph representation of the first video, comprising a plurality of nodes corresponding to the plurality of local atomic units, wherein generating the local graph representation comprises applying local graph edges connecting the plurality of nodes to each other, wherein the local graph edges represent relationships between the connected nodes based, at least in part, on the attributes of the corresponding local atomic units;
generating a global graph representation of a plurality of videos that includes the first video, wherein one node of the global graph representation is derived from the local graph representation of the first video;
receiving a query of the global graph representation for information associated with content of the plurality of videos; and
producing, in response to the query and by analyzing the global graph representation, a response including the information associated with the content of the plurality of videos.

20. The non-transitory computer-readable medium of claim 19, wherein the functions performed by the one or more computing devices further comprise:
generating a global atomic unit comprising attributes derived from the local graph representation,
wherein the global graph representation includes a first node corresponding to the global atomic unit corresponding to the first video and a plurality of second nodes corresponding to respective global atomic units of respective second videos of the plurality of videos, and wherein generating the global graph representation of the plurality of videos comprises applying global graph edges connecting the plurality of nodes to each other, the global graph edges representing relationships between the connected nodes based, at least in part, on the attributes of the corresponding global atomic units.

21. The method of claim 1, wherein at least one of the local graph edges representing relationships between one local atomic unit with another local atomic unit corresponds to a relationship wherein:
a context window corresponding to the one local atomic unit occurs prior in time to a context window corresponding to the other local atomic unit, a context window corresponding to the one local atomic unit occurs subsequent in time to a context window corresponding to the other local atomic unit, a context window corresponding to the one local atomic unit is a sub-portion of a context window corresponding to the other local atomic unit, or a context window corresponding to the one local atomic unit overlaps a context window corresponding to the other local atomic unit.

* * * * *